Feb. 8, 1938.    F. PRICE ET AL    2,107,500
MILK CAN CONVEYER
Filed June 23, 1937    2 Sheets-Sheet 2

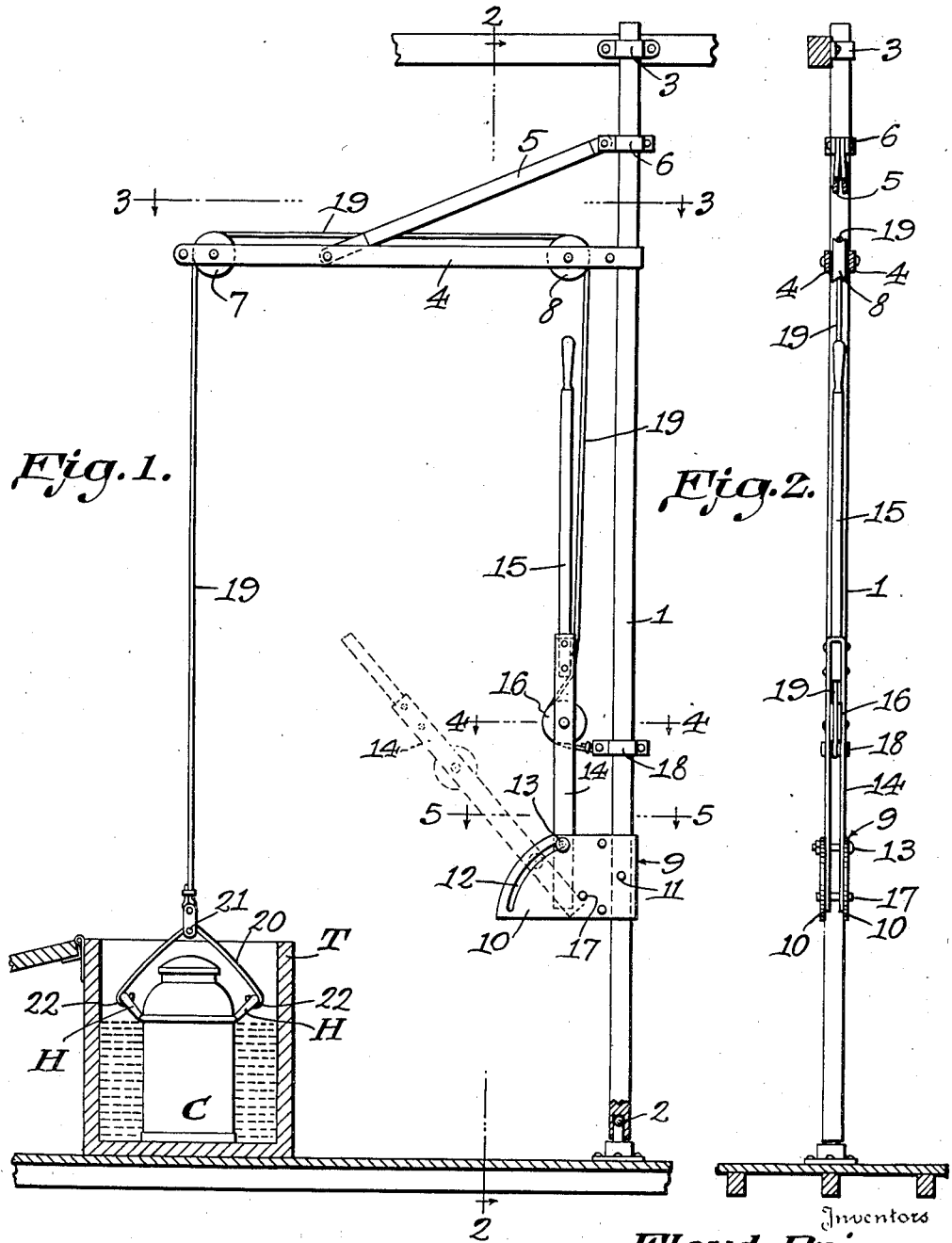

Inventors
Floyd Price
Adelbert F. Palmer
By C. A. Snow & Co.
Attorneys.

Patented Feb. 8, 1938

2,107,500

UNITED STATES PATENT OFFICE 2,107,500

MILK CAN CONVEYER

Floyd Price and Adelbert F. Palmer,
Wellsboro, Pa.

Application June 23, 1937, Serial No. 149,971

1 Claim. (Cl. 212—61)

This invention relates to a conveyer designed primarily for handling milk cans.

Under the laws of most states it is necessary for the milk producer to place the cans containing the milk in coolers. As the filled cans are quite heavy, it is a difficult matter generally to place them in and remove them from the coolers which, ordinarily, are in the form of troughs containing cold water.

An object of the present invention is to provide a simple and efficient means whereby the cans can be readily raised and lowered relative to the trough and moved toward and from positions therein and thereover without requiring the strength and skill heretofore necessary.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings—

Figure 1 is an elevation of the conveyer, the cooler and base portion being shown in section.

Figure 2 is a section on line 2—2, Figure 1.

Figure 3:
Figure 3 is a section on line 3—3, Figure 1.
Figure 4:
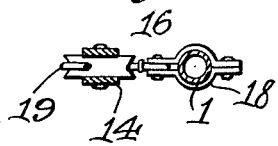
Figure 4 is a section on line 4—4, Figure 1.
Figure 5:
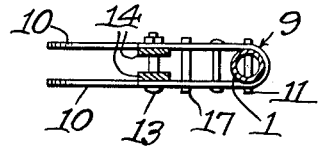
Figure 5 is a section on line 5—5, Figure 1.

Referring to the figures by characters of reference I designates a post which, in the structures shown in Figures 1 to 5 inclusive, is mounted at its lower end on a thrust-bearing 2 while its upper end portion is mounted in a fixedly held bearing 3.

Secured to the post 1 at a suitable elevation is an arm 4 of any desired length and reenforced preferably by means of a brace 5 connecting the arm to a collar 6 secured to the post. This arm carries a pulley 7 near its free end and another pulley 8 near the post.

A bracket 9 made up of spaced plates or wings 10 is secured to the lower portion of the post 1 as shown at 11 and the wings 10 of this bracket are formed with opposed arcuate slots 12 in which a cross-pin 13 is mounted to slide. This pin extends through a lever 14 which is supported between the wings 10 and has an extension handle 15 whereby it can be actuated readily. Lever 14 carries a pulley 16.

Extending between and carried by the wings 10 and adjacent to the post 1 is a stop pin 17 located in the path of the lower portion of lever 14 when said lever is shifted out of normal position.

A clamp 18 is secured to the post 1 above but adjacent to the bracket 9 and secured to this clamp is one end of a cable 19 the other end of which carries a grapple 20 made up of opposed arms pivotally connected at 21 and provided with hooks 22 turned inwardly toward each other.

Cable 19 extends from clamp 18 through lever 14 and partly around pulley 16. From this pulley it extends upwardly over pulleys 8 and 7 and thence downwardly to the grapple.

When the lever 14 is in its elevated or raised position as is shown in Figures 1 and 2, the grapple 20 is in its lowermost position where it can readily be placed in engagement with the ears or handles H of a milk can C. The conveyer constituting the invention is adapted to be located adjacent to a cooler which can be in the form of a trough T containing cold water. If a can is to be placed in the cooler the arm 4 is swung into position so as to support the grapple 20 directly over the can whereupon the hooks 22 can be placed in engagement with the handle H. The upwardly extending lever 14 is then swung downwardly. This will cause the lower end portion thereof to move against stop pin 17 while pin 13 will travel downwardly within the slots 12. At the same time pulley 16 will draw upon the cable 19, causing the grapple 20 to move upwardly and carry the can with it. While the can is elevated the post 1 can be turned so as to swing arm 4 to position where the can will be suspended over the cooler, this swinging action being effected by pulling or thrusting on the extension 15 of lever 14 while it is lowered. After the can has been brought to proper position, the lever is allowed to swing upwardly and this will pay out the cable 19 and allow the grapple 20 and the can to move downwardly into the cooler to the position shown in Figure 1. This operation can be repeated for removing the can from the cooler.

By mounting the lever as described and by connecting it in the manner shown to the cable 19, the leverage effected through the actuation of lever 14 is greatly increased so that the heavy can can be raised and lowered with the expenditure of very little effort.

Figure 6:
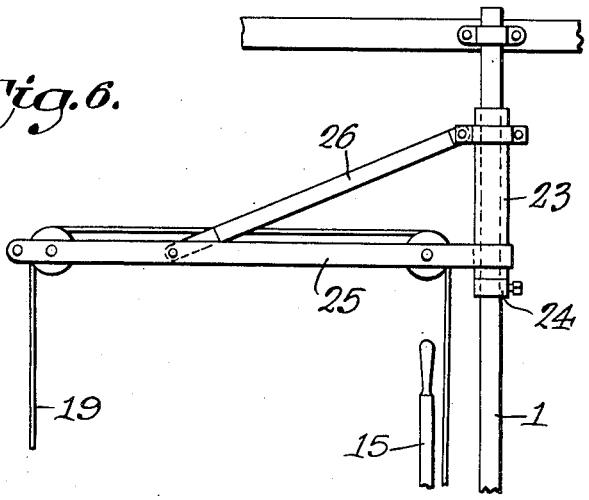
Figure 6 is an elevation of a portion of a slightly modified form of the device.

Instead of mounting the post 1 so that it will turn as described, said post can be fixedly mounted and, as shown in Figure 6, a sleeve 23 supported by a fixed collar 24, can be mounted for rotation on the post. Arm 25 can be extended from this sleeve as can also the brace 26. In other respects the structure is the same as that heretofore described and operates in the same manner.

What is claimed is:

A conveyer of the class described including a post, an arm supported thereby and mounted to swing about the longitudinal axis of the post, a bracket extending from the post and including spaced wings having arcuate slots, a stop connecting the wings, a lever movably mounted between the wings, a member carried by the lever and movable within the slots during the actuation of the lever, said lever being movable against the stop to be fulcrumed thereon during said actuation, a lifting cable, a can engaging means at one end thereof, means for attaching the other end of the cable to the post, a pulley carried by the lever for holding the cable thereto, and spaced cable supporting pulleys on the arm.

FLOYD PRICE.
ADELBERT F. PALMER.